(12) United States Patent
Toyokawa et al.

(10) Patent No.: US 7,896,245 B2
(45) Date of Patent: Mar. 1, 2011

(54) SETTING-INFORMATION CREATING APPARATUS, SETTING-INFORMATION CREATING METHOD, INFORMATION OUTPUT SYSTEM, AND COMPUTER PRODUCT

(75) Inventors: Takashi Toyokawa, Inagi (JP); Yasuyoshi Sato, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 461 days.

(21) Appl. No.: 12/026,176

(22) Filed: Feb. 5, 2008

(65) Prior Publication Data

US 2008/0185431 A1 Aug. 7, 2008

(30) Foreign Application Priority Data

Feb. 5, 2007 (JP) ................................. 2007-026103

(51) Int. Cl.
*G06F 19/00* (2006.01)
*G06Q 30/00* (2006.01)
*G06Q 90/00* (2006.01)

(52) U.S. Cl. ........................ 235/385; 235/375; 235/487
(58) Field of Classification Search .................. 235/385, 235/375, 376, 487; 705/10, 14
See application file for complete search history.

(56) References Cited

U.S. PATENT DOCUMENTS 7,420,464 B2 * 9/2008 Fitzgerald et al. ....... 340/539.13
2005/0200464 A1 * 9/2005 Bennie et al. ................. 340/442

FOREIGN PATENT DOCUMENTS

| JP | 2001-34850 A | 2/2001 |
|---|---|---|
| JP | 2002-304671 A | 10/2002 |
| JP | 2006-155286 A | 6/2006 |

* cited by examiner

*Primary Examiner* — Edwyn Labaze
(74) *Attorney, Agent, or Firm* — Westerman, Hattori, Daniels & Adrian, LLP

(57) ABSTRACT

In a cart terminal device, a goods-layout-information storage unit stores goods layout information, having information indicating a layout region within a shop related to a goods classification indicating goods laid out in the layout region, and a contents-position-information storage unit stores contents position information, having a transmitter number related to the goods classification. When a user assigns an optional position and an optional transmitter within the shop, a transmitter-position-information creating unit obtains a goods classification corresponding to the position by referencing the goods layout information, and obtains a goods classification corresponding to the transmitter by referencing the contents position information. When the obtained goods classifications coincide with each other, the transmitter-position-information creating unit creates transmitter position information, having position information related to a transmitter number for identifying the transmitter.

7 Claims, 10 Drawing Sheets

FIG.3

| GOODS CODE | GOODS NAME | GOODS CLASSIFICATION | PRICE |
|---|---|---|---|
| VEA001 | CABBAGE | VEGETABLE AND FRUIT | 200 |
| VEA002 | CARROT | VEGETABLE AND FRUIT | 100 |
| VEA003 | BANANA | VEGETABLE AND FRUIT | 150 |
| ... | ... | ... | ... |
| MEA001 | PORK | MEAT | 600 |
| MEA002 | BEEF | MEAT | 400 |
| MEA003 | SAUSAGE | MEAT | 300 |
| ... | ... | ... | ... |

FIG.4

| GOODS CLASSIFICATION | LAYOUT REGION (X1,Y1 - X2,Y2) |
|---|---|
| MEAT | 160, 0 - 31, 20 |
| VEGETABLE AND FRUIT | 260, 150 - 319, 199 |
| ALCOHOLIC BEVERAGE | 120, 150 - 179, 199 |
| SWEETS | 0, 150 - 59, 199 |
| ... | ... |

FIG.5

| TRANSMITTER NUMBER | CONTENTS NAME | GOODS NAME | GOODS CLASSIFICATION |
|---|---|---|---|
| 1 | beaf_sale | MEA001 | MEAT |
| 2 | carrot_pres | VEA002 | VEGETABLE AND FRUIT |
| 3 | salmon_cook | FIS004 | FISH |
| 4 | beer_adve | ALC001 | ALCOHOLIC BEVERAGE |
| . | . | . | . |
| . | . | . | . |
| . | . | . | . |

FIG.6

| TRANSMITTER NUMBER | POSITION (X,Y) |
|---|---|
| 1 | 180, 10 |
| 2 | 280, 170 |
| 3 | 100, 10 |
| 4 | 150, 160 |
| . | . |
| . | . |
| . | . |

FIG.9

| TRANSMITTER NUMBER | CONTENTS NAME | | | GOODS NAME | GOODS CLASSIFICATION |
|---|---|---|---|---|---|
| 1 | beaf_sale | REFERENCE | DISPLAY | BEEF ▶ | MEAT |
| 2 | carrot_pres | REFERENCE | DISPLAY | CARROT ▶ | VEGETABLE AND FRUIT |
| 3 | salmon_cook | REFERENCE | DISPLAY | SALMON ▶ | FISH |
| 4 | beer_adve | REFERENCE | DISPLAY | BEER ▶ | ALCOHOLIC BEVERAGE |
|  |  | REFERENCE | DISPLAY | WHISKY |  |
|  |  | REFERENCE | DISPLAY | WINE |  |
|  |  | REFERENCE | DISPLAY | JAPANESE SAKE |  |
|  |  | REFERENCE | DISPLAY | DISTILLED SPIRIT |  |
|  |  | REFERENCE | DISPLAY | COCKTAIL |  |
|  |  | REFERENCE | DISPLAY |  ▶ |  |
|  |  | REFERENCE | DISPLAY |  ▶ |  |
|  |  | REFERENCE | DISPLAY |  ▶ |  |

«CONTENTS LIST»
drink_sale
beer_adve
wine_sale
cocktail_info

GOODS LIST

REGISTER

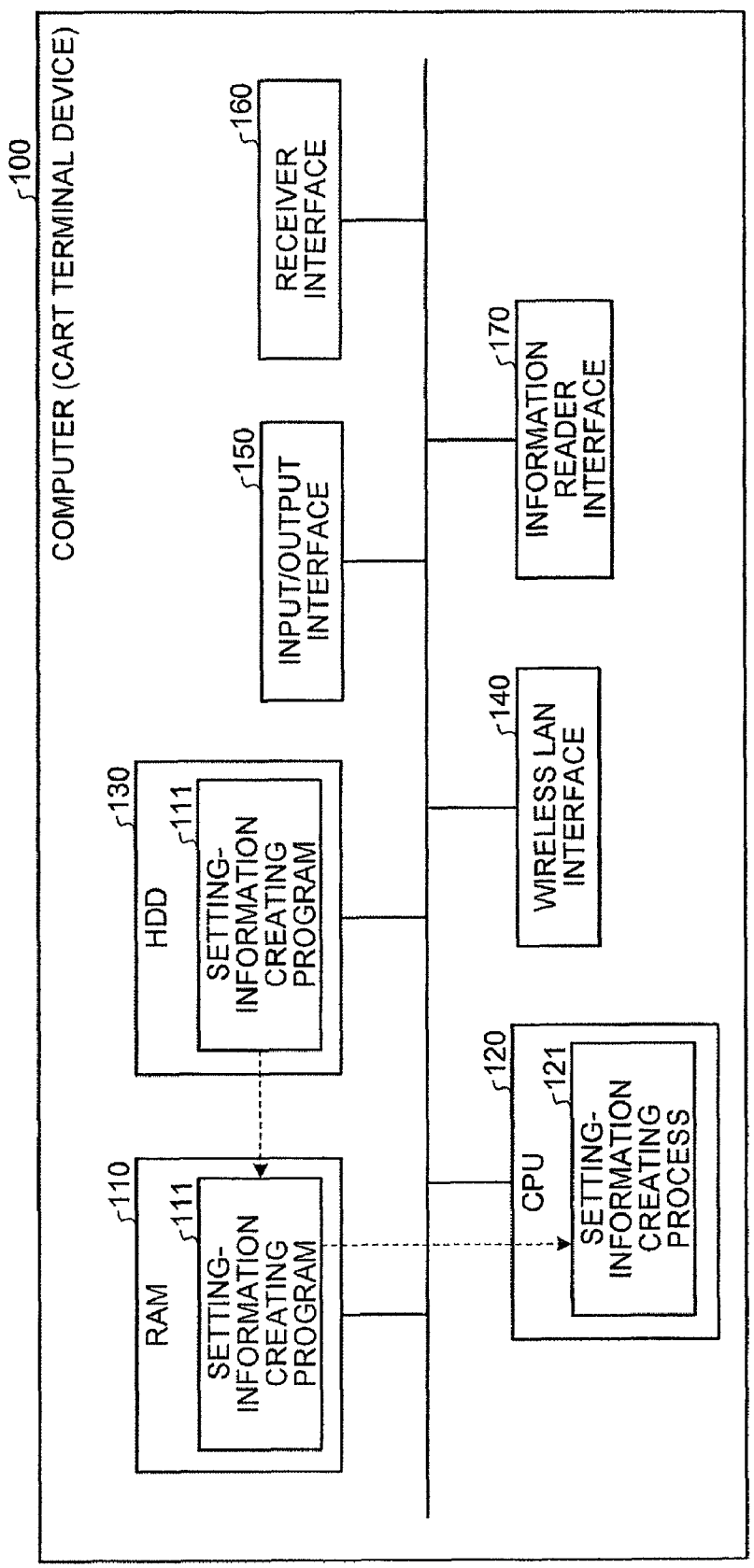

SETTING-INFORMATION CREATING APPARATUS, SETTING-INFORMATION CREATING METHOD, INFORMATION OUTPUT SYSTEM, AND COMPUTER PRODUCT

BACKGROUND OF THE INVENTION

1. Field of the Invention

The present invention relates to a setting-information creating apparatus, a setting-information creating method, an information output system, and a computer product that create setting information to be set to an information terminal device that outputs information concerning goods within a site based on transmitter information transmitted from each transmitter installed at each position within the site.

2. Description of the Related Art

There are conventional methods of attaching a display device to a shopping cart used in a supermarket and the like, and outputting information concerning goods to the display device. For example, there are disclosed a technique of detecting a position of a shopping cart using an IC tag or the like, and outputting an advertisement of goods present nearby in the display device, and a technique of identifying goods using a bar code reader, and outputting a name, a price, and a goods guidance of the goods to the display device (for example, see Japanese Patent Application Laid-open Nos. 2001-34850, 2002-304671, and 2006-155286).

Usually, according to the above conventional techniques, information output to the display device is controlled using various kinds of setting information such as setting information having position information and goods information related to each other, and setting information having information identifying goods and information concerning goods related to each other.

Therefore, in the supermarket and the like, layout positions of goods within the shop and kinds of arranged goods are changed to match the season and time. In this case, the above various kinds of setting information also need to be changed to match the changed layout position and the changed kinds of goods.

However, when there are many kinds of handled goods and when a wide area for goods is targeted, the amount of setting information to be registered and changed becomes large, and enormous amount of work becomes necessary to change the setting information. When the setting information is not changed correctly, various pieces of information concerning goods different from the information concerning goods present near the shopping cart are output, and information concerning goods different from the goods identified using a barcode reader is output, and the users can be confused.

Therefore, how easily the setting information to be used to control the output of various kinds of information is registered and changed becomes a considerably important issue.

SUMMARY OF THE INVENTION

It is an object of the present invention to at least partially solve the problems in the conventional technology.

According to an aspect of the present invention, a setting-information creating apparatus creates setting information to be set to an information terminal device that outputs information relevant to goods within a site based on transmitter information transmitted from a transmitter installed at each point within the site. The setting-information creating apparatus includes a goods-layout-setting storage unit that stores therein goods-layout setting information indicating a correspondence between region information specifying a region within the site and goods information specifying goods laid out in the region; an output-information-setting storage unit that stores therein output-information setting information indicating a correspondence between the transmitter information and the goods information; and a setting-information creating unit that obtains a first goods information corresponding to an optional position within the site assigned by a user, based on the goods-layout-setting information, obtains a second goods information corresponding to an optional transmitter assigned by the user, based on the output-information setting information, and creates transmitter-position setting information representing a predetermined correspondence between the position information for identifying the position assigned by the user and the transmitter information for identifying the transmitter assigned by the user, when the obtained first and second goods information coincide with each other.

According to another aspect of the present invention, a setting-information creating method creates setting information to be set to an information terminal device that outputs information relevant to goods within a site based on transmitter information transmitted from a transmitter installed at each point within the site. The setting-information creating method includes storing goods-layout setting information indicating a correspondence between region information specifying a region within the site and goods information specifying goods laid out in the region; storing output-information setting information indicating a correspondence between the transmitter information and the goods information; obtaining a first goods information corresponding to an optional position within the site assigned by a user, based on the goods-layout-setting information; obtaining a second goods information corresponding to an optional transmitter assigned by the user, based on the output-information setting information; and creating transmitter-position setting information representing a predetermined correspondence between the position information for identifying the position assigned by the user and the transmitter information for identifying the transmitter assigned by the user, when the obtained first and second goods information coincide with each other.

According to still another aspect of the present invention, an information output system includes an information terminal device that outputs information concerning goods within a site, based on transmitter information transmitted from a transmitter installed at each point within the site, and a server device that manages the information terminal device. The server device includes a goods-layout-setting storage unit that stores therein goods-layout setting information indicating a correspondence between region information specifying a region within the site and goods information specifying goods laid out in the region; an output-information-setting storage unit that stores therein output-information setting information indicating a correspondence the transmitter information and the goods information; a setting-information creating unit that obtains a first goods information corresponding to an optional position within the site assigned by a user, based on the goods-layout-setting information, obtains a second goods information corresponding to an optional transmitter assigned by the user, based on the output-information setting information, and creates transmitter-position setting information representing a predetermined correspondence between the position information for identifying the position assigned by the user and the transmitter information for identifying the transmitter assigned by the user, when the obtained first and second goods information coincide with each other; and a setting-information transmitting unit that transmits the goods-layout setting information, the output-information setting information, and the transmitter-position setting information to the information terminal device. Also the information terminal device includes a setting-information receiving unit that receives the goods-layout setting information, the output-information setting information, and the transmitter-position setting information transmitted from the server device; and a goods-relevant-information output unit that outputs information concerning goods within the site, based on the goods-layout setting information, the output-information setting information, and the transmitter-position setting information received by the setting-information receiving unit, when the goods-relevant-information output unit receives the transmitter information transmitted from the transmitter.

According to still another aspect of the present invention, an information terminal device outputs information concerning goods within a site, based on transmitter information transmitted from a transmitter installed at each point within the site. The information terminal device includes: a goods-layout-setting storage unit that stores goods-layout setting information indicating a correspondence between region information specifying a region within the site and goods information specifying goods laid out in the region; an output-information-setting storage unit that stores output-information setting information indicating a correspondence the transmitter information and the goods information; setting-information creating unit that obtains a first goods information corresponding to an optional position within the site assigned by a user, based on the goods-layout-setting information, obtains a second goods information corresponding to an optional transmitter assigned by the user, based on the output-information setting information, and creates transmitter-position setting information representing a predetermined correspondence between the position information for identifying the position assigned by the user and the transmitter information for identifying the transmitter assigned by the user, when the obtained first and second goods information coincide with each other; and a goods-relevant-information output unit that outputs information concerning goods within the site, based on the goods-layout setting information, the output-information setting information, and the transmitter-position setting information, upon reception of the transmitter information transmitted from the transmitter.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a goods-master-information storage unit;

FIG. 4 is a diagram illustrating an example of a goods-layout-information storage unit;

FIG. 5 is a diagram illustrating an example of a contents-position-information storage unit;

FIG. 6 is a diagram illustrating an example of a transmitter-position-information storage unit;

FIG. 9 is a diagram illustrating an example of a contents-position-information registration screen;

FIG. 12 is a functional block diagram of a configuration of a computer that executes a setting-information creating program according to the embodiment.

DETAILED DESCRIPTION OF THE PREFERRED EMBODIMENTS

Exemplary embodiments of a setting-information creating apparatus, a setting-information creating method, a setting-information creating program, and an information output system according to the present invention will be explained below in detail with reference to the accompanying drawings. In an embodiment of the present invention, explanations are made about the application of the present invention to a goods-information output system that includes a cart terminal device and a shop server device that manages the cart terminal device. The cart terminal device is installed in a shopping cart used in a supermarket or a convenience store and outputs information concerning goods within the shop based on transmitter information transmitted from each transmitter installed at each point within the shop.

Figure 1:
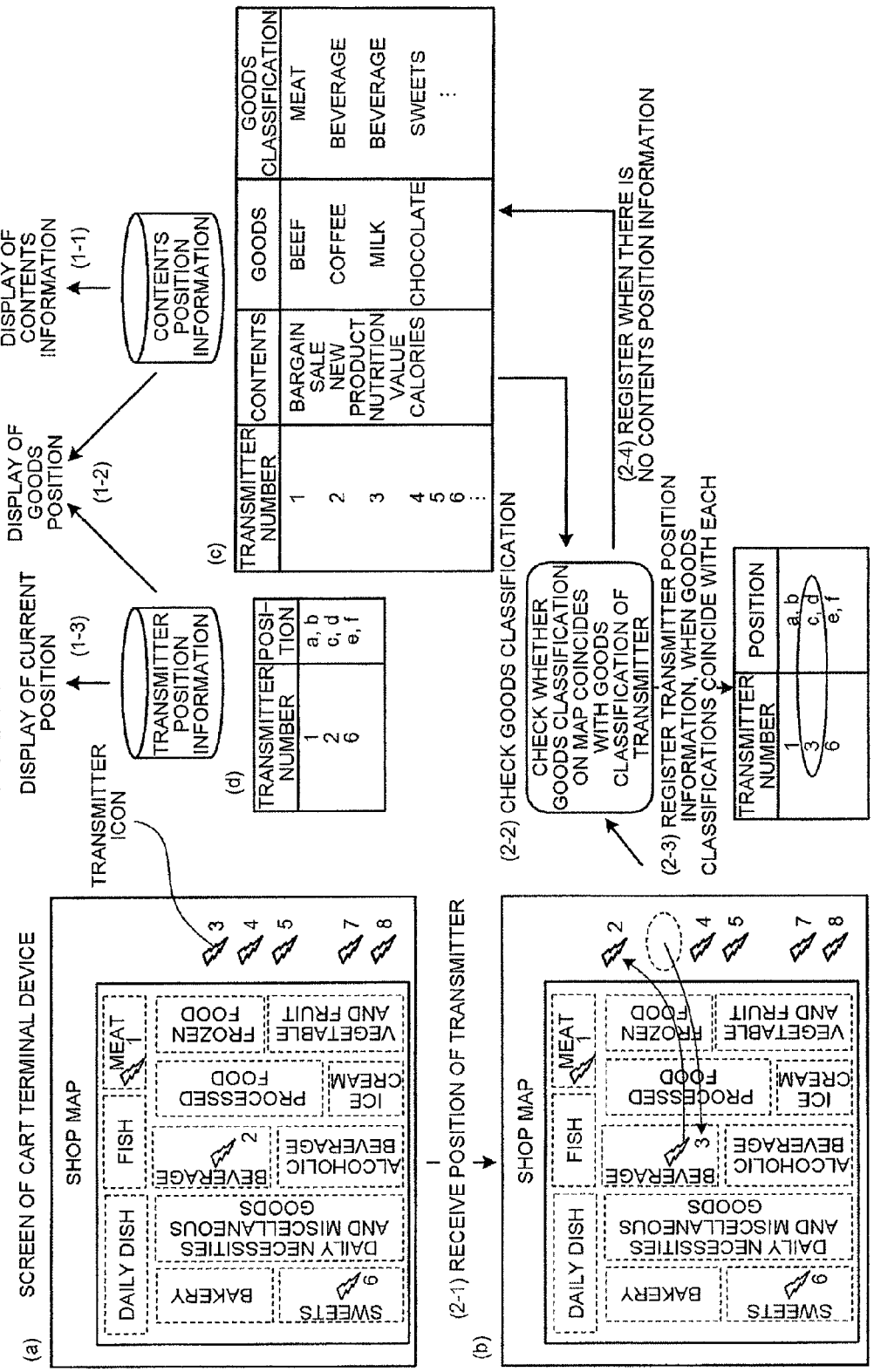
FIG. 1 is a schematic diagram for explaining an outline of a setting-information creating method in a goods-information output system according to an embodiment of the present invention.

First, an outline of the setting-information creating method in the goods-information output system according to the present embodiment is explained. FIG. 1 is a schematic diagram for explaining the outline of the setting-information creating method in the goods-information output system according to the present embodiment. FIG. 1 is one example of a screen output by the display device provided in the cart terminal device, and one example of a data structure of setting information set in the cart terminal device.

The cart terminal device used in the goods-information output system according to the present embodiment includes a receiver that receives a transmitter number (transmitter information) transmitted from the transmitter within the shop, a display device that displays various kinds of information, and an information reading unit that reads a goods code from a barcode attached to the goods.

The cart terminal device stores various kinds of setting information. Specifically, the cart terminal device stores goods master information having a goods code that identifies goods, a name of the goods, and a goods classification of the goods related to each other, contents information having the goods code, contents information as information concerning goods such as an advertisement and guidance related to each other, goods layout information having a layout region showing the region within the shop, and a goods classification of goods laid out in the layout region related to each other, contents position information having a transmitter number that identifies the transmitter, goods, and goods classification related to each other, and transmitter position information having an installation position of the transmitter within the shop and the transmitter number that identifies the transmitter related to each other.

The shop server creates these pieces of set information before the shop opens, and the shop server distributes the information to each cart terminal device corresponding to a transmission request that the terminal device transmits to the shop server when the power source is turned on.

The cart terminal device has an operation mode including a normal mode of outputting information concerning goods to customers and a maintenance mode for performing maintenance of various kinds of setting information. The operation mode is selected by a maintenance person such as a sales person (user).

Each operation mode is briefly explained. First, in the normal mode, the cart terminal device moves within the shop following the cart that a customer uses. When a receiver receives a transmitter number, the cart terminal device outputs contents information corresponding to the transmitter number, to the display device, based on the contents position information (see (1-1) in FIG. 1).

When the information reading device reads a goods code, the cart terminal device outputs a shop map showing the arrangement of layout regions of goods within the shop by kinds of goods, to the display device. The cart terminal device also blink displays the position of goods corresponding to the goods code on the shop map, based on the contents position information and the transmitter position information (see (1-2) in FIG. 1).

When a customer requests the display of the current position, the cart terminal device receives a transmitter number of a transmitter nearby using a receiver, and blink displays the position of the transmitter, based on the transmitter position information (see (1-3) in FIG. 1).

On the other hand, in the maintenance mode, the cart terminal device outputs a screen for registering a position of the transmitter to the display device, according to the instruction of the maintenance person such as a sales person (user). In FIG. 1, (a) indicates a screen output in the maintenance mode. As shown in FIG. 1, the cart terminal device outputs a region within the shop, and a goods classification of goods laid out in each region, to the display device, and further outputs an icon (hereinafter, "transmitter icon") indicating a position of the transmitter, to the display device.

In this case, the cart terminal device displays a transmitter icon on the shop map, based on a position of the transmitter position information, regarding a transmitter registered in both the contents position information and the transmitter position information. On the other hand, the cart terminal device displays a transmitter icon at a predetermined position outside the shop map, regarding a transmitter registered in the contents position information but not registered in the transmitter position information (such as transmitter icons 3, 4, 5 shown in (a) in FIG. 1).

For example, assume that information such as transmitter numbers "1", "2", "3", "4", "5", and "6" is registered in the contents position information, as shown in (c) in FIG. 1, and information such as transmitter numbers "1", "2", and "6" is registered in the transmitter position information, as shown in (d) in FIG. 1. In this case as shown in (a) in FIG. 1, the cart terminal device displays the transmitter icons corresponding to the transmitter numbers "1", "2", and "6" on the shop map, and displays the transmitter icons corresponding to the transmitter numbers "3", "4", and "5" outside the shop map.

Assume that goods "coffee" and a goods classification "beverage" are related to the transmitter of the transmitter number "2", and that goods "milk" and a goods classification "beverage" are related to the transmitter number "3", and these are registered, respectively, as shown in (c) in FIG. 1. To facilitate the explanation, "goods" is used instead of "goods code", in the contents information.

Consider that a position where a coffee is located so far at a beverage selling space within the actual shop is replaced with milk, for example. In this case, the maintenance person first operates the cart terminal, and moves the transmitter icon of the transmitter number "2" to the outside of the shop map from the shop map displayed in the display device (see (2-1) in FIG. 1). In this case, the cart terminal device deletes the information of the transmitter number "12" from the transmitter position information.

Next, the maintenance person moves the transmitter icon of the transmitter number "3" displayed at the outside of the shop map to the position where the transmitter icon of the transmitter number "2" was present (see (2-1) in FIG. 1). In this case, the cart terminal device checks whether the goods classification of the layout region on the shop map on which the transmitter icon of the transmitter number "3" is located coincides with the goods classification of the transmitter number "3" of the contents position information (see (2-2) in FIG. 1). In this case, both goods classifications are "beverage", and the classifications coincide with each other. The cart terminal device registers the transmitter number "3" and positions ("c and d" in this example) in the transmitter position information, by relating these pieces of information to each other (see (2-3) in FIG. 1).

Assume that the maintenance person moves the transmitter icon of the transmitter number "3" to the layout region of "alcoholic beverage" by error, at the time of moving this transmitter icon. In this case, the cart terminal device outputs an alarm message to the screen, because the goods classification of the layout region in which the transmitter icon is located does not coincide with the goods classification of the transmitter number "3".

Further, assume that the information of the transmitter number "3" is not registered in the contents position information yet. In this case, the cart terminal device confirms that the information of the transmitter number "3" is not present in the contents position information at the time of checking the goods classification. Then, the cart terminal device references the goods master information and the contents information (not shown in FIG. 1), creates a list of goods belonging to the goods classification "beverage" and the contents information, and outputs the list on the screen. When the maintenance person selects goods ("milk", in this example) and contents information, the cart terminal device registers the selected contents information and goods, and the goods classification "beverage", in the contents position information, by relating these pieces of information to the transmitter number "3" (see (2-4) in FIG. 1).

The function of the maintenance mode explained above is also provided in the shop server in a similar manner, and is used to perform initial registration and change of each piece of setting information.

As explained above, the goods-information output system according to the present embodiment includes a cart terminal device that is installed in the shopping cart used in the supermarket or the convenience store. The cart terminal device outputs information concerning the goods within the shop based on transmitter information transmitted from each transmitter installed at each point within the shop. The goods-information output system also includes a shop server device that manages the cart terminal device. The cart terminal device and the server device can easily register and change the setting information used to control the output of the contents information, goods positions, and transmitter positions, using the above-described function of the maintenance mode.

Figure 2:
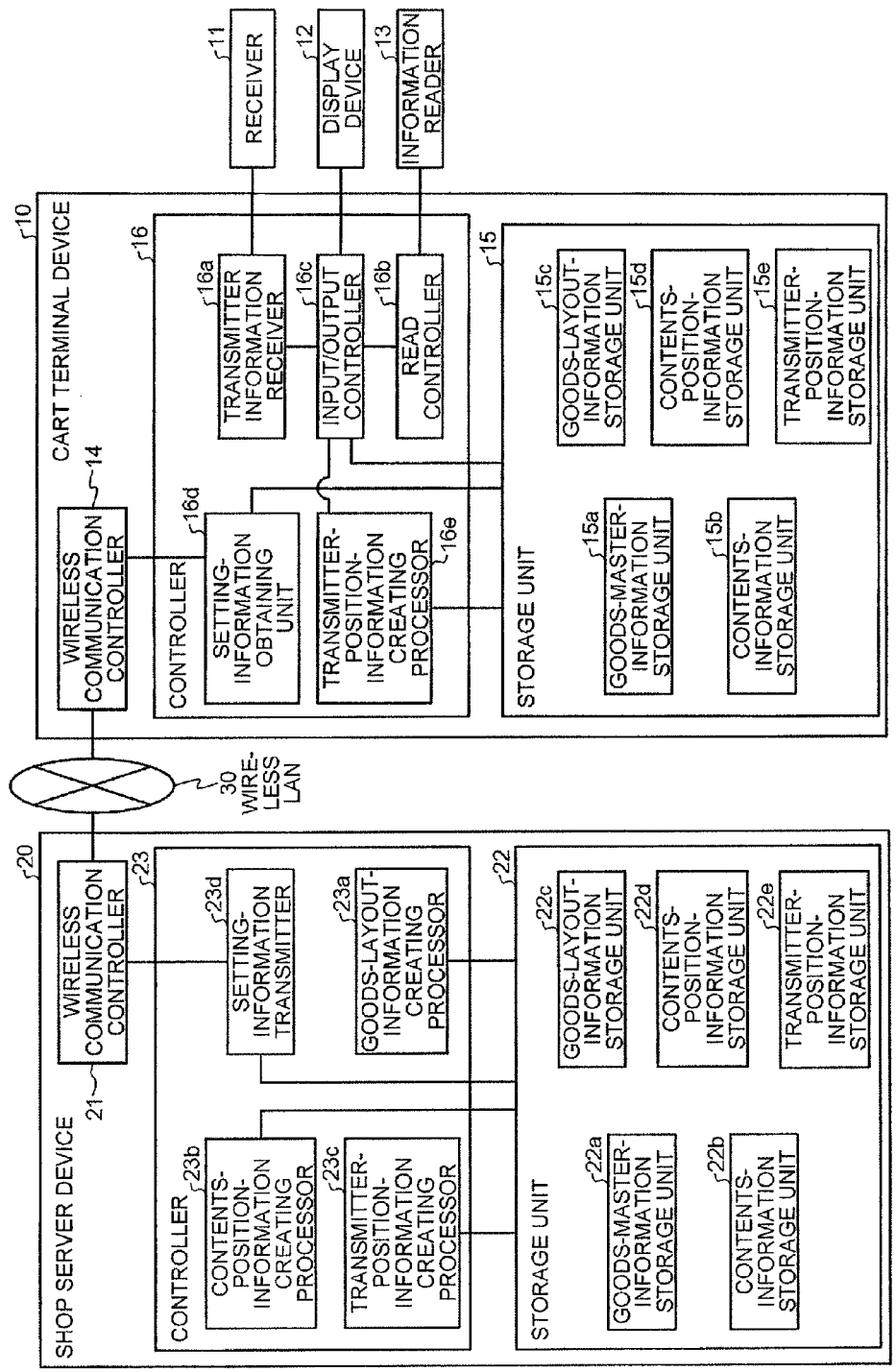
FIG. 2 is a functional block diagram of a configuration of the goods-information output system according to the embodiment.

The configuration of the goods-information output system according to the present embodiment is explained next. FIG. 2 is a functional block diagram of the configuration of the goods-information output system according to the present embodiment. As shown in FIG. 2, this goods-information output system includes a cart terminal device 10, and a shop server device 20. The cart terminal device 10 and the shop server device 20 are communicably connected to each other via a wireless local area network (LAN) 30.

The configuration of the cart terminal device 10 is explained first. The cart terminal device 10 includes a receiver 11, a display device 12, an information reader 13, a wireless communication controller 14, a storage unit 15, and a controller 16.

The receiver 11 receives transmitter information transmitted from a transmitter within a shop. For example, when an infrared transmitter is used as a transmitter, the receiver 11 becomes an infrared receiver, and when an IC (integrated circuit) tag is used as a transmitter, the receiver 11 becomes an IC tag reader.

The display device 12 displays various kinds of information, and a user can input the information using the display device 12 such as a touch panel.

The information reader 13 is a barcode reader that reads a goods code from the barcode attached to the goods.

The wireless communication controller 14 is a processor that controls wireless communications between the cart terminal device 10 and the shop server device 20.

The storage unit 15 stores various kinds of information and programs, and includes a goods-master-information storage unit 15a, a contents-information storage unit 15b, a goods-layout-information storage unit 15c, a contents-position-information storage unit 15d, and a transmitter-position-information storage unit 15e, as units relevant to the present invention.

Among these units, the goods-master-information storage unit 15a stores goods master information for identifying various kinds of goods. FIG. 3 is one example of the goods-master-information storage unit 15a. For example, the goods-master-information storage unit 15a stores goods codes for identifying goods, goods names of the goods, goods classifications of the goods, and prices of the goods, as goods master information, by relating these pieces of information to each other.

The contents-information storage unit 15b stores contents information containing an advertisement and guidance. The contents-information storage unit 15b stores information relating a goods code to a contents name indicating information concerning goods such as an advertisement and guidance, as contents information. The contents name is a name of various kinds of information (file) such as an advertisement and guidance, and these pieces of information are stored in a predetermined region of the storage unit 15.

The goods-layout-information storage unit 15c stores goods layout information to display the region within the shop where goods are laid out, for each kind of goods. FIG. 4 is one example of the goods-layout-information storage unit 15c. For example, the goods-layout-information storage unit 15c stores information having a goods classification and a layout region where the goods of the goods classification are laid out, related to each other, as goods layout information, as shown in FIG. 4. The layout region is a rectangular region displayed on the screen of the display device 12, and is displayed at two points in the X-Y coordinates defined on the screen. That is, the layout region is a rectangular region having a diagonal line connecting between these two points, and having sides of two lines parallel with the X axis and two lines parallel with the Y axis.

The contents-position-information storage unit 15d stores contents position information to define a position at which each piece of information is output, for each piece of information concerning goods such as an advertisement and guidance. FIG. 5 is one example of the contents-position-information storage unit 15d. For example, the contents-position-information storage unit 15d stores information having a transmitter number for identifying a transmitter, a contents name indicating information concerning goods to be output when the transmitter number is received, a goods code of the goods, and a goods classification of the goods, by relating these pieces of information to each other, as contents position information, as shown in FIG. 5.

The transmitter-position-information storage unit 15e stores transmitter position information to display a position at which the transmitter is installed. FIG. 6 is one example of the transmitter-position-information storage unit 15e. For example, the transmitter-position-information storage unit 15e stores a transmitter number for identifying a transmitter, and a position within the shop at which the transmitter is installed, by relating these pieces of information to each other, as transmitter position information, as shown in FIG. 6. A position within the shop is a rectangular region displayed on the screen of the display device 12, and is displayed at one point in the X-Y coordinates defined on the screen.

The controller 16 controls the total of the cart terminal device 10. The controller 16 includes a transmitter information receiver 16a, a read controller 16b, an input/output controller 16c, a setting-information obtaining unit 16d, and a transmitter-position-information creating processor 16e, as units relevant to the present invention.

Among these units, the transmitter information receiver 16a is a processor that controls the receiver 11, and obtains a transmitter number from the transmitter information received by the receiver 11. Specifically, the transmitter information receiver 16a confirms whether the receiver 11 receives transmission information at every constant time (a unit of few seconds, for example). When the receiver 11 receives the transmitter information, the transmitter information receiver 16a obtains a transmitter number from the transmitter information, and delivers the obtained transmitter number to the input/output controller 16c.

The read controller 16b is a processor that obtains a goods code read by the information reader 13. Specifically, when a user brings a barcode attached to goods within the shop to the information reader 13, the read controller 16b obtains the goods code read by the information reader 13, and delivers the obtained goods code to the input/output controller 16c.

The input/output controller 16c is a processor that controls the output of various kinds of information to the display device 12 and reception of various kinds of information input via the display device 12. Specifically, upon receiving a transmitter number from the transmitter information receiver 16a, the input/output controller 16c searches contents position information stored in the contents-position-information storage unit 15d, based on the transmitter number. Upon detecting the contents position information corresponding to the transmitter number, the input/output controller 16c obtains the information of the contents name set in the detected contents position information from the storage unit 15, and outputs this information to the display device 12.

When a user instructs a display of the current position via the display device 12, the input/output controller 16c searches the transmitter position information stored in the transmitterposition-information storage unit 15e, based on the transmitter number received from the transmitter information receiver 16a. Upon detecting the transmitter position information corresponding to the transmitter number, the input/output controller 16c outputs the shop map to the display device 12, and blink displays a point indicated by the position set in the detected transmitter position information, as the current position.

When the input/output controller 16c receives a goods code from the read controller 16b, the input/output controller 16c searches the contents position information stored in the contents-position-information storage unit 15d, based on the goods code. Upon detecting the contents position information corresponding to the transmitter number, the input/output controller 16c searches the transmitter position information stored in the transmitter-position-information storage unit 15e, based on the transmitter number set in the detected contents position information. Upon detecting the transmitter position information corresponding to the transmitter number, the input/output controller 16c outputs the shop map to the display device 12, and blink displays a point indicated by the position set in the detected transmitter position information, as the position of the goods.

The input/output controller 16c also receives a selection of the operation mode from the user via the display device 12. When a selection of the normal mode is received, the input/output controller 16c performs the process explained above. On the other hand, when a selection of the maintenance mode is received, the input/output controller 16c outputs a transmitter-position-information registration screen to register the position of the transmitter, to the display device 12, based on the transmitter position information stored in the transmitter-position-information storage unit 15e.

Figure 7A:
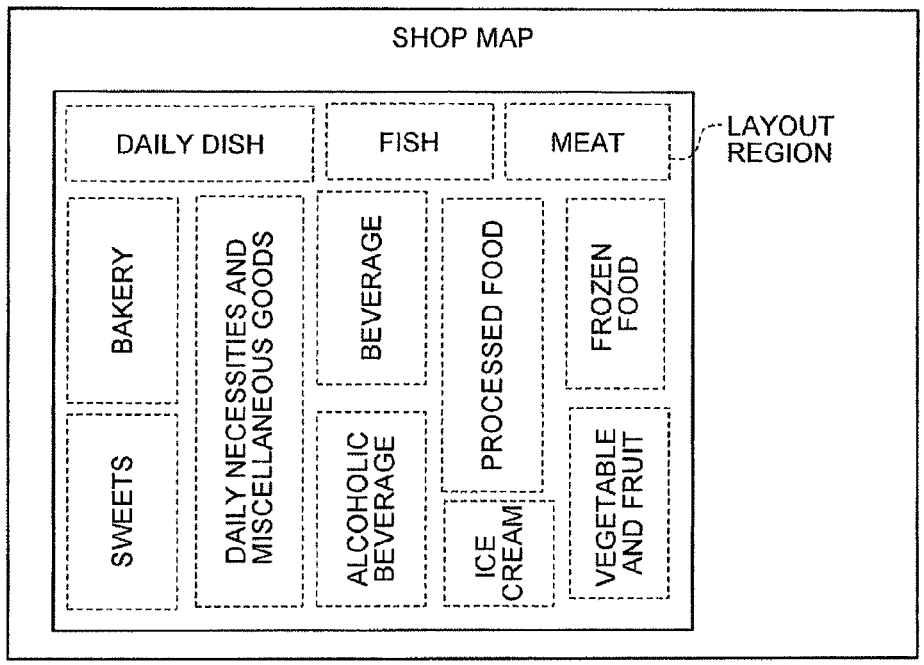
FIGS. 7A and 7B are diagrams illustrating an example of a transmitter-position-information registration screen.
Figure 7B:
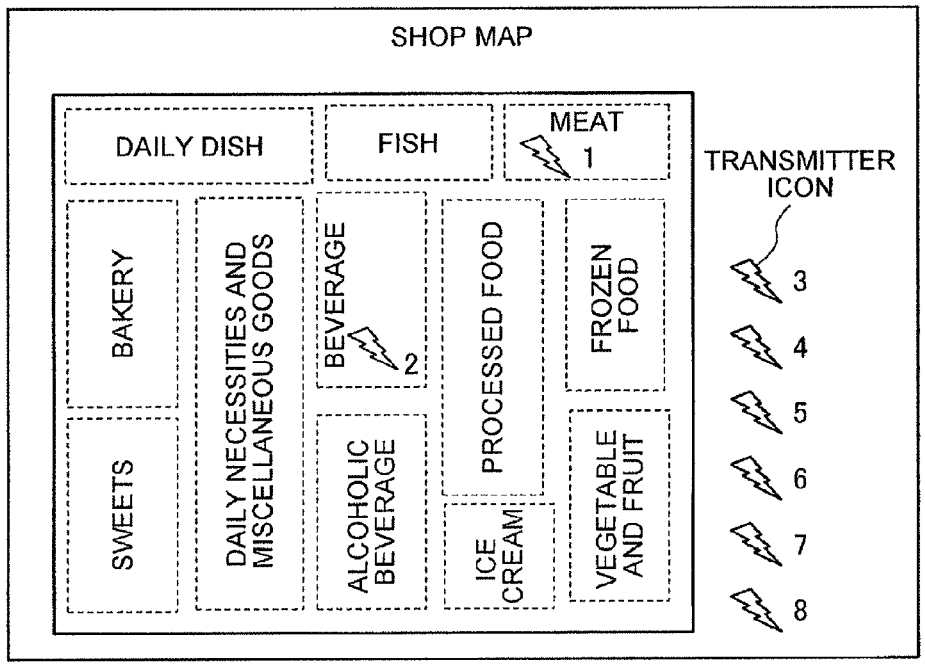

FIGS. 7A and 7B are one example of a transmitter-position-information registration screen. The input/output controller 16c first outputs a layout region in which goods are laid out within the shop, and a goods classification of goods to be laid out in each layout region, as a shop map, to the display device 12, as shown in FIG. 7A.

The input/output controller 16c further references the transmitter position information stored in the transmitter-position-information storage unit 15e, and outputs the transmitter icon to the layout region on the shop map, based on the transmitter number and the position registered in the transmitter position information. For example, the input/output controller 16c displays the transmitter icons 1 and 2 in the layout region of meat and the layout region of beverage, respectively, as shown in FIG. 7B. In this case, the input/output controller 16c references the contents position information stored in the contents-position-information storage unit 15d. When there is a transmitter number not registered in the transmitter position information but registered in the contents position information, the input/output controller 16c outputs the transmitter icon indicating the transmitter of the transmitter number, to a predetermined position at the outside of the shop map. For example, the input/output controller 16c displays the transmitter icons 3 to 8 in order at the right side of the shop map, as shown in FIG. 7B.

The user can locate the transmitter icon displayed on the transmitter-position-information registration screen, in an optional layout region on the shop map, by operating the display device 12. When the user locates any one transmitter icon in any one layout region, the input/output controller 16c delivers the transmitter number of the transmitter indicated by the located transmitter icon and the coordinates in which the transmitter is laid out, to the transmitter-position-information creating processor 16e, by relating the transmitter number to the coordinates.

As explained above, the position of the transmitter can be easily determined, by outputting a transmitter-position-information registration screen to the display device having the touch panel and the input/output function, and achieving the graphical user interface (GUI) using a shop map and a transmitter icon.

The setting-information obtaining unit 16d is a processor that obtains various kinds of setting information from the shop server device 20. Specifically, the setting-information obtaining unit 16d transmits a transmission request of setting information to the shop server device 20 via the wireless communication controller 14 at a predetermined timing such as a timing of turning on the power source of the cart terminal device 10. The setting-information obtaining unit 16d stores goods master information, contents information, goods layout information, contents position information, and transmitter position information, transmitted from the shop server device 20, in the goods-master-information storage unit 15a, the contents-information storage unit 15b, the goods-layout-information storage unit 15c, the contents-position-information storage unit 15d, and the transmitter-position-information storage unit 15e, of the storage unit 15, respectively. In this case, the setting-information obtaining unit 16d obtains various kinds of information such as an advertisement and guidance indicated by the contents name, at the same time, and stores these pieces of information in a predetermined region of the storage unit 15.

The transmitter-position-information creating processor 16e is a processor that creates transmitter position information and contents position information based on the position and the transmitter assigned by the user. Specifically, upon receiving the transmitter number and the coordinates from the input/output controller 16c, the transmitter-position-information creating processor 16e searches the goods layout information stored in the goods-layout-information storage unit 15c, based on the received position. Upon detecting the goods layout information in which the region including the goods is set, the transmitter-position-information creating processor 16e obtains the goods classification set in the detected goods layout information.

The transmitter-position-information creating processor 16e searches the contents position information stored in the contents-position-information storage unit 15d, based on the received transmitter number. Upon detecting the contents position information in which the transmitter number is set, the transmitter-position-information creating processor 16e obtains the goods classification set in the detected contents position information.

The transmitter-position-information creating processor 16e compares the obtained goods classifications. When the goods classifications coincide with each other, the transmitter-position-information creating processor 16e creates the transmitter position information by relating the received transmitter number and the coordinates to the goods classification, and registers the transmitter position information in the transmitter-position-information storage unit 15e.

When the goods classifications do not coincide with each other, the transmitter-position-information creating processor 16e determines that the transmitter is located in the layout region of an erroneous goods classification, and outputs an alarm message to the display device 12.

As a result of searching the contents position information, when the transmitter-position-information creating processor 16e cannot detect the contents position information in which the received transmitter number is set, the transmitter-position-information creating processor 16e searches the goods master information stored in the goods-master-information storage unit 15a, based on the received goods classification, and obtains all the goods master information in which the goods classification is set.

The transmitter-position-information creating processor 16e searches the contents-information storage unit 15b for each goods code set in the obtained goods master information, and obtains all contents information in which the goods codes are set. The transmitter-position-information creating processor 16e creates a list having the goods names related to the contents names, based on the goods codes and the contents names set in the obtained contents information, and outputs the list to the display device 12. In creating the list, the transmitter-position-information creating processor 16e searches the goods master information stored in the goods-master-information storage unit 15a, based on the goods codes, and obtains the goods names and goods classification corresponding to the respective goods codes.

The user can assign goods and contents information to a transmitter to be laid out, from the list. When the user assigns the goods and contents information, the transmitter-position-information creating processor 16e creates the contents position information by relating the transmitter number received from the input/output controller 16c, the goods code for identifying the assigned goods, and the assigned contents name, by relating these pieces of information to each other, and registers the contents position information in the contents-position-information storage unit 15d.

Thereafter, the transmitter-position-information creating processor 16e creates the transmitter position information by relating the transmitter number received from the input/output controller 16c and the coordinates, and registers the transmitter position information in the transmitter-position-information storage unit 15e.

As explained above, the transmitter-position-information creating processor 16e creates the transmitter position information and the contents position information, based on the position and the transmitter assigned by the user using the transmitter-position-information registration screen. Therefore, these pieces of the setting information can be easily registered and changed.

The configuration of the shop server device 20 is explained next. The shop server device 20 includes a wireless communication controller 21, a storage unit 22, and a controller 23, as shown in FIG. 2. The shop server device 20 also includes peripheral devices provided in the general server device, such as a display device and an input device not shown in FIG. 2.

The wireless communication controller 21 is a processor that controls the wireless communications between the cart terminal device 10 and the shop server device 20.

The storage unit 22 stores various kinds of information and programs, and includes a goods-master-information storage unit 22a, a contents-information storage unit 22b, a goods-layout-information storage unit 22c, a contents-position-information storage unit 22d, and a transmitter-position-information storage unit 22e, as units relevant to the present invention. These storage units store pieces of information similar to those stored in the goods-master-information storage unit 15a, the contents-information storage unit 15b, the goods-layout-information storage unit 15c, the contents-position-information storage unit 15d, and the transmitter-position-information storage unit 15e explained above, and therefore explanations thereof will be omitted. The storage unit 22 also stores various kinds of information (file) such as an advertisement and guidance identified by the contents name.

A setting-information transmitter 23d described later transmits the information stored in the storage unit to each cart terminal device, corresponding to a transmission response transmitted from each cart terminal device 10.

The controller 23 controls the total of the shop server device 20, and includes a goods-layout-information creating processor 23a, a contents-position-information creating processor 23b, a transmitter-position-information creating processor 23c, and the setting-information transmitter 23d, as units relevant to the present invention.

The goods-layout-information creating processor 23a creates goods layout information, based on the goods classification and the layout region assigned by the user. Specifically, the goods-layout-information creating processor 23a outputs a goods-layout-information registration screen for assigning the goods classification and the layout region, to the display device, corresponding to the request from the manager of the shop server device 20.

Figure 8A:
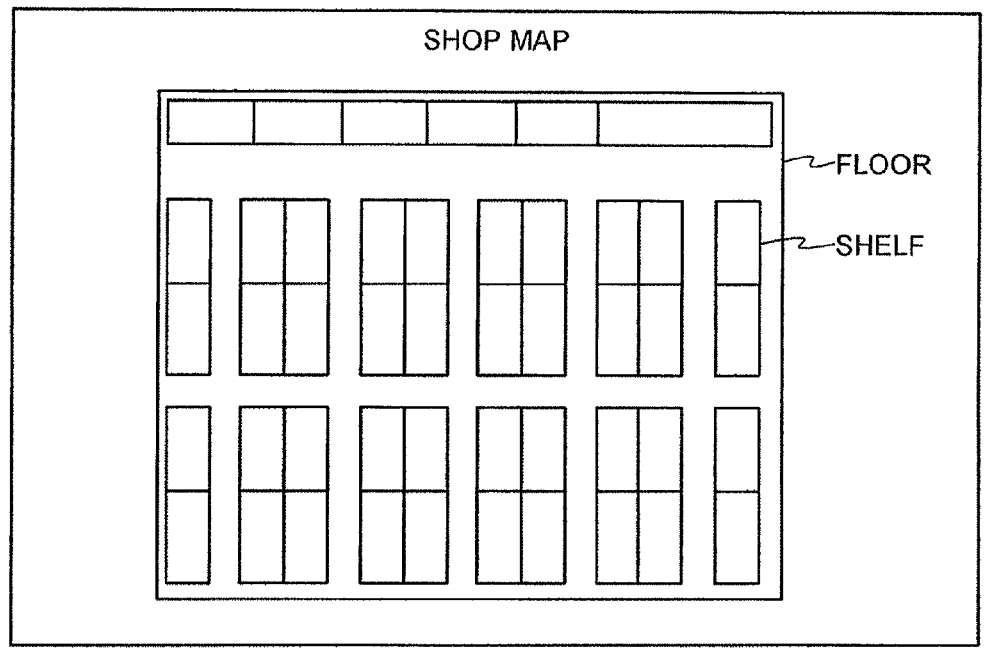
FIGS. 8A and 8B are diagrams illustrating an example of a goods-layout-information registration screen.
Figure 8B:
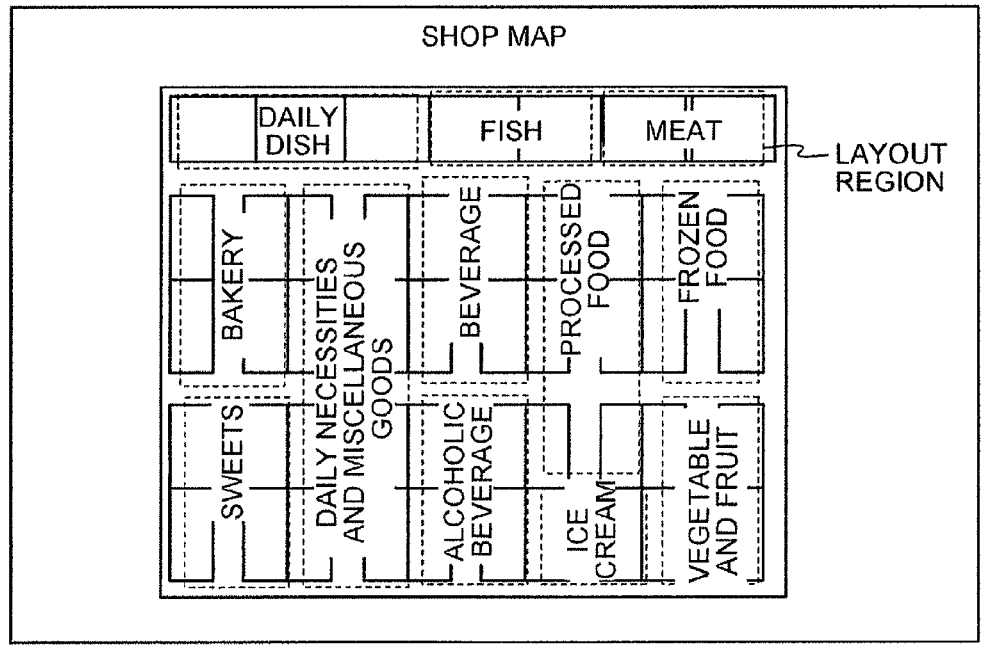

FIGS. 8A and 8B are one example of the goods-layout-information registration screen. The goods-layout-information creating processor 23a first outputs a floor within the shop, and shelves installed within the shop, as a shop map, to the display device, as shown in FIG. 8A.

The user can set a layout region at an optional place on the goods-layout-information registration screen, by operating the input device such as a mouse and a keyboard. The layout region is a rectangular region displayed on the goods-layout-information registration screen, and is expressed at two points in the X-Y coordinates defined on the screen. That is, the layout region is a rectangular region having a diagonal line connecting between these two points, and having sides of two lines parallel with the X axis and two lines parallel with the Y axis.

The user can further assign goods classifications of goods laid out in the layout regions, in the set layout region. For example, the user sets 12 layout regions, and lays out "daily dish", "fish", "meat", "bakery", "sweets", "beverage", "daily necessities and miscellaneous goods", "alcoholic beverage", "processed food", "ice cream", "frozen food", and "fruits and vegetables", in the set layout regions, as shown in FIG. 8B.

When the user assigns the layout regions and the goods classifications, the goods-layout-information creating processor 23a creates goods layout information by relating the two-point coordinates expressing the layout region and the goods classification to each other, and stores the goods layout information in the goods-layout-information storage unit 22c.

The user can easily create the contents position information, by assigning the layout region and goods classification, using the goods-layout-information registration screen, as explained above.

The contents-position-information creating processor 23b creates contents position information, based on a transmitter number assigned by the user, a contents name, a goods code, and a goods classification. Specifically, the contents-position-information creating processor 23b outputs a contents-position-information registration screen for assigning the transmitter number, the contents name, the goods code, and the goods classification, on the display device, at the request of the manager and the like of the shop server device 20.

FIG. 9 is one example of the contents-position-information registration screen. The contents-position-information creating processor 23b displays a screen for assigning a contents name, a goods name, and a goods classification, for each transmitter number, as the contents-position-information registration screen, as shown in FIG. 9.

When the user selects a "reference" button in the region for assigning a contents name, the contents-position-information creating processor 23b references various kinds of information such as an advertisement and guidance stored in the storage unit 22, creates a list of contents names indicating the reference information, and outputs this list as a contents list, to the display device. The user can easily assign the contents name by selecting the target content name from the contents list.

When the user selects a "display" button in the region for assigning a contents name, the contents-position-information creating processor 23b obtains various kinds of information such as an advertisement and guidance corresponding to the contents name, based on the contents name assigned at this point of time, from the storage unit 22, and outputs the information to the display device. As a result, the user can securely assign the target information, by actually confirming various kinds of information such as an advertisement and guidance.

When the user selects a pulldown button in the region for assigning a goods name, the contents-position-information creating processor 23b references the goods master information stored in the goods-master-information storage unit 22a, obtains goods names and goods classifications registered in the goods master information, generates a list of the obtained goods names, and outputs the list as a goods list, to the display device. The user can easily assign a goods name and a goods classification, by selecting the goods name from the goods name list.

When the user selects a "register" button on the screen after assigning the transmitter number, the contents name, the goods name, and the goods classification, the contents-position-information creating processor 23b creates the contents position information by relating the transmitter number, the contents name, the goods name, and the goods classification that are assigned, by relating these pieces of information to each other, and stores the contents position information in the contents-position-information storage unit 22d.

As explained above, the user can easily create the contents position information, by assigning the transmitter number, the contents name, the goods name, and the goods classification, using the contents-position-information registration screen.

The transmitter-position-information creating processor 23c creates transmitter position information and contents position information, based on the position and the transmitter assigned by the user. The transmitter-position-information creating processor 23c has a function similar to that of the transmitter-position-information creating processor 16e explained above, and therefore explanations thereof will be omitted. Upon creating the transmitter position information and the contents position information, the transmitter-position-information creating processor 23c stores these pieces of information in the transmitter-position-information storage unit 22e and the contents-position-information storage unit 22d, respectively.

The setting-information transmitter 23d is a processor that transmits various kinds of setting information to the cart terminal device 10. Specifically, upon receiving a transmission request of the setting information from the cart terminal device 10, the setting-information transmitter 23d transmits, in response to this request, the goods master information stored in the goods-master-information storage unit 22a, the contents information stored in the contents-information storage unit 22b, the goods layout information stored in the goods-layout-information storage unit 22c, the contents position information stored in the contents-position-information storage unit 22d, and the transmitter position information store in the transmitter-position-information storage unit 22e, to the cart terminal device 10 that transmits the transmission request, via the wireless communication controller 21.

While only one cart terminal device is explained above for the convenience of explanation, the goods-information output system according to the present embodiment includes plural cart terminal devices.

Figure 10:
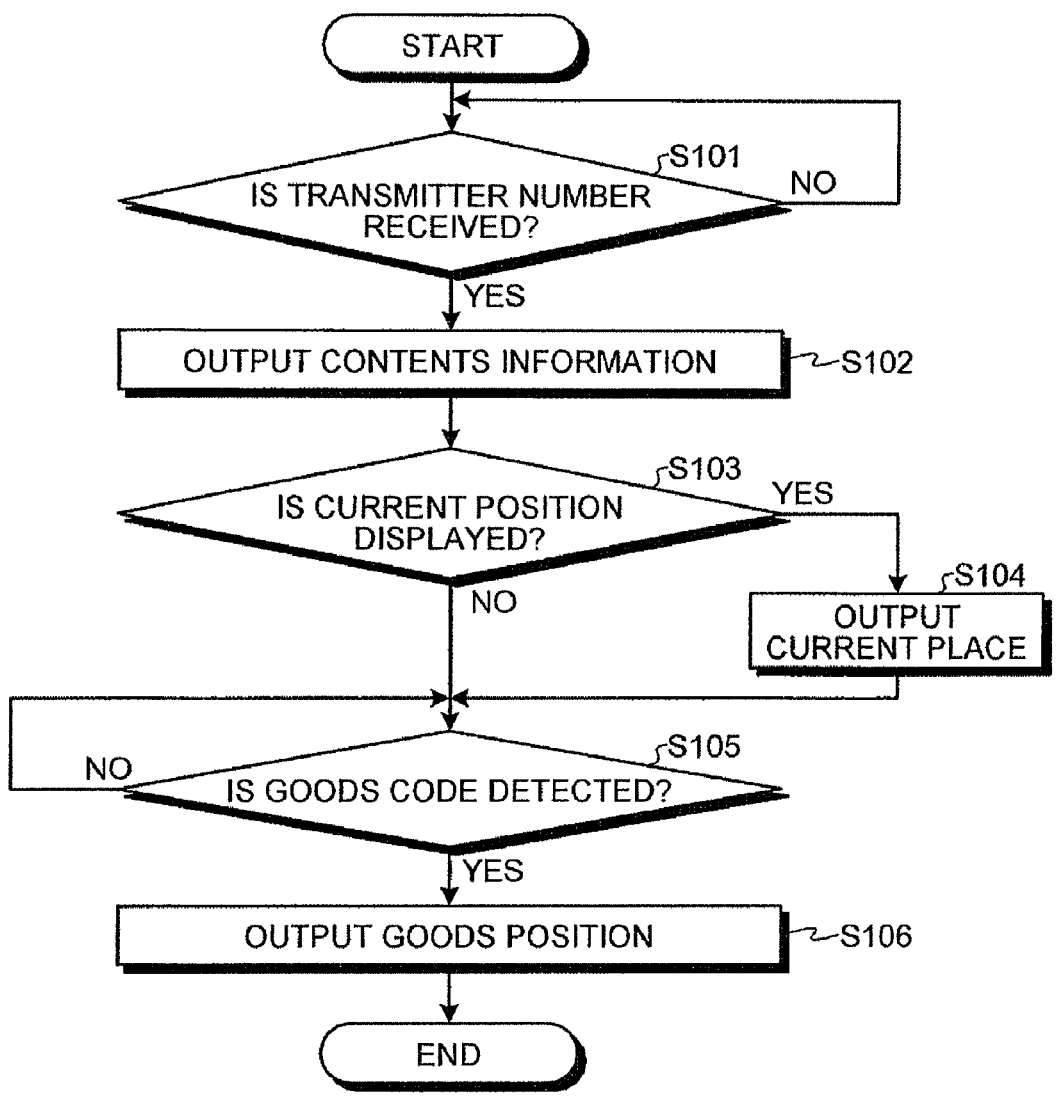
FIG. 10 is a flowchart of a process procedure of a cart terminal device in a normal mode.
Figure 11:
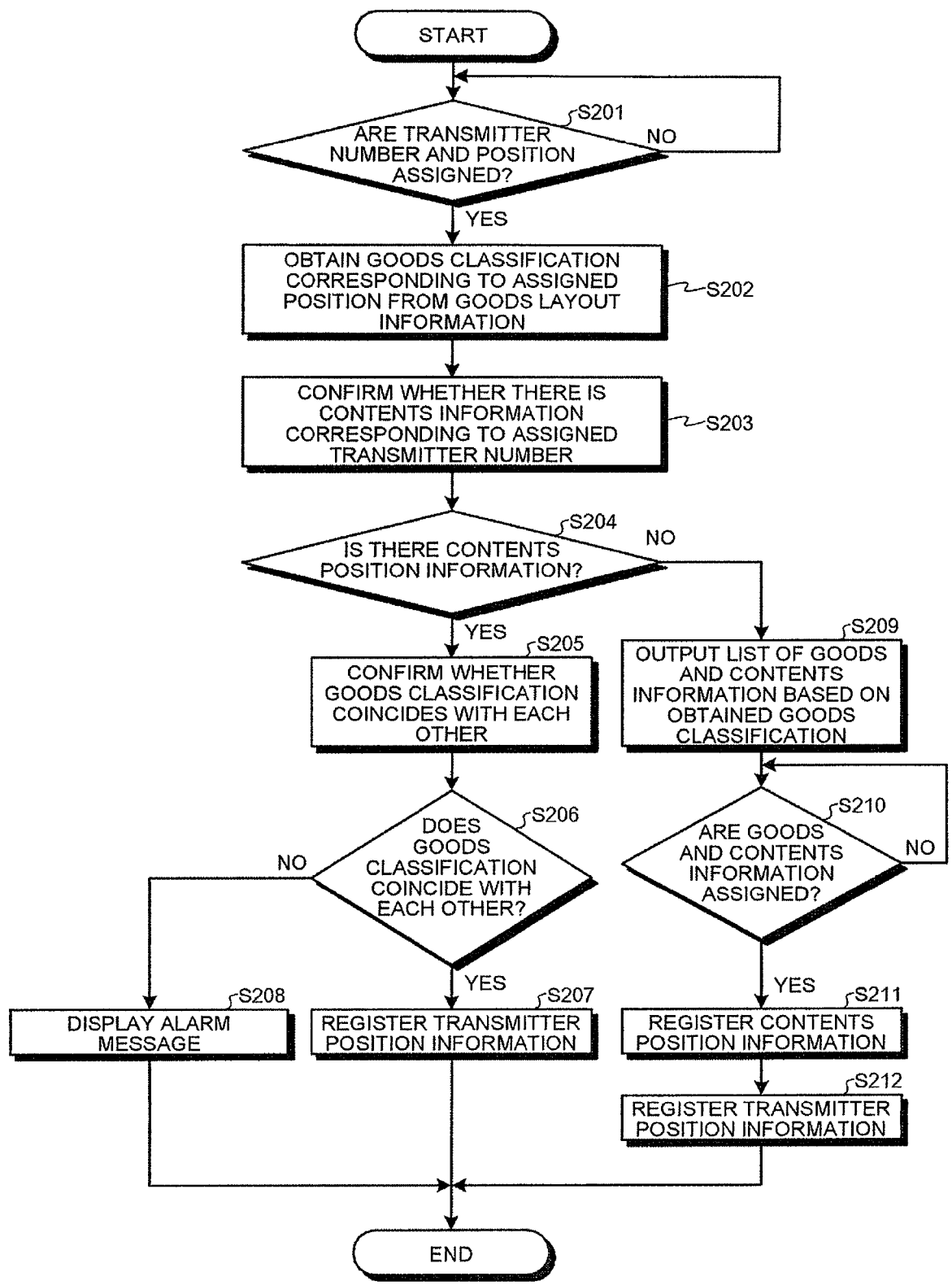
FIG. 11 is a flowchart of a process procedure of the cart terminal device in a maintenance mode.

Process procedures of the cart terminal device 10 according to the present embodiment in the normal mode and in the maintenance mode respectively are explained below. FIG. 10 is a flowchart of the process procedure of the cart terminal device 10 in the normal mode, and FIG. 11 is a flowchart of the process procedure of the cart terminal device 10 in the maintenance mode.

The process procedure in the normal mode is explained first. As shown in FIG. 10, in the cart terminal device 10, when the transmitter information receiver 16a receives a transmitter number via the receiver 11 (YES at step S101), the input/output controller 16c outputs contents information to the display device 12, based on the transmitter number, and the contents position information stored in the contents-position-information storage unit 15d (step S102).

When the user assigns the current position display (YES at step S103), the input/output controller 16c flicker displays the current position in the display device 12, based on the transmitter number received by the transmitter information receiver 16a, and the transmitter position information stored in the transmitter-position-information storage unit 15e (step S104).

When the read controller 16b detects a goods code via the information reader 13 (YES at step S105), the input/output controller 16c flicker displays the current position corresponding to the goods code in the display device 12, based on the goods code, the contents position information stored in the contents-position-information storage unit 15d, and the transmitter position information stored in the transmitter-position-information storage unit 15e (step S106).

The process procedure in the maintenance mode is explained next. As shown in FIG. 11, in the cart terminal device 10, when the user assigns a transmitter number and a position using the transmitter-position-information registration screen that the input/output controller 16c outputs to the display device 12 (YES at step S201), the transmitter-position-information creating processor 16e obtains the goods classification corresponding to the assigned position from goods layout information stored in the goods-layout-information storage unit 15c (step S202).

The transmitter-position-information creating processor 16e confirms whether the contents position information corresponding to the assigned transmitter number is present in the contents-position-information storage unit 15d (step S203). When the contents position information is present in the contents-position-information storage unit 15d (YES at step S204), the transmitter-position-information creating processor 16e confirms whether the goods classification of the contents position information coincides with the goods classification obtained from the goods layout information (step S205).

When the goods classifications coincide with each other (YES at step S206), the transmitter-position-information creating processor 16e creates the transmitter position information based on the transmitter number and the position (coordinates) assigned by the user, registers the created transmitter position information in the transmitter-position-information storage unit 15e (step S207), and ends the process.

On the other hand, when the goods classification do not coincide with each other (NO at step S206), the transmitterposition-information creating processor 16e displays an alarm message in the display device 12 (step S208), and ends the process.

When the contents position information corresponding to the assigned transmitter number is not present in the contents-position-information storage unit 15d (NO at step S204), the transmitter-position-information creating processor 16e creates a list of the goods and the contents information, based on the goods classification obtained from the goods layout information, and outputs the list to the display device 12 (step S209).

When the user assigns the goods and the contents information using the output list (YES at step S210), the transmitter-position-information creating processor 16e creates the contents position information, based on the goods and the contents information assigned, and registers the created contents position information in the contents-position-information storage unit 15d (step S211).

The transmitter-position-information creating processor 16e creates the transmitter position information based on the transmitter number and the position (coordinates) assigned by the user, registers the created transmitter position information in the transmitter-position-information storage unit 15e (step S212), and ends the process.

As explained above, the transmitter-position-information creating processor 16e creates the contents information as well as the transmitter position information, thereby making it possible to delete work required for the creation of setting information, and facilitate the creation of the setting information.

As described above, in the present embodiment, the cart terminal device 10 stores goods layout information, having the information indicating the layout region within the shop, and the goods classification indicating the goods laid out in the layout region, in the goods-layout-information storage unit 15c, by relating these pieces of information to each other. The cart terminal device 10 stores contents position information, having the transmitter number and the goods classification related to each other, in the contents-position-information storage unit 15d. When the user assigns an optional position and an optional transmitter within the shop, the transmitter-position-information creating processor 16e obtains a goods classification corresponding to the position by referencing the goods layout information, and obtains a goods classification corresponding to the transmitter by referencing the contents position information. When the obtained goods classifications coincide with each other, the transmitter-position-information creating processor 16e creates the transmitter position information having the position information (coordinates) indicating the position and the transmitter number for identifying the transmitter, related to each other. Therefore, the setting information to be used to control the output of the goods-relevant information can be easily registered and changed.

Further, according to the present invention, in the cart terminal device 10, in referencing the contents position information, when the transmitter-position-information creating processor 16e finds that the goods classification corresponding to the transmitter assigned by the user is not included in the contents position information stored in the contents-position-information storage unit 15d, the transmitter-position-information creating processor 16e references the goods layout information stored in the goods-layout-information storage unit 15c, obtains the goods classification corresponding to the position assigned by the user, and stores the contents position information, having the obtained goods classification and the transmitter number for identifying the transmitter assigned by the user, related to each other, in the contents-position-information storage unit 15d. Therefore, by simultaneously creating the transmitter position information and the contents position information, the work required to create the setting information can be decreased. As a result, the setting information to be used to control the output of the information can be registered and changed more easily.

Further, according to the present invention, in the cart terminal device 10, the transmitter-position-information creating processor 16e outputs the information having the layout region within the shop related to the goods classification indicating the goods laid out in the layout region, to the display device, as the goods-layout-information registration screen, based on the goods layout information. When the user assigns the position and the transmitter using the output information, the cart terminal device 10 obtains the goods classification corresponding to the position and the goods classification corresponding to the transmitter. When the obtained goods classifications coincide with each other, the cart terminal device 10 creates the transmitter position information having the position information (coordinates) indicating the position related to the transmitter number for identifying the transmitter. Therefore, the setting information to be used to control the output of information can be registered and changed more easily, by achieving the user interface to create the setting information using the display device and the icons.

While an embodiment of the present invention has been explained above, the invention can be carried out in various manners other than the embodiment.

For example, the cart terminal device 10 can include a processor having a function similar to that of the goods-layout-information creating processor 23a and the contents-position-information creating processor 23b provided in the shop server device 20. With this arrangement, even when the shop server device 20 and the wireless LAN 30 cannot be used for some reason, the cart terminal device 10 can register goods layout information and contents position information.

While the transmitter-position-information storage units 15e and 22e are explained to store the information having a transmitter number and a position related to each other, as the transmitter position information, in the present embodiment, the information to be contained in the transmitter position information is not limited to this. For example, a distance from the adjacent transmitter can be included, in place of the position. Specifically, a distance between the own transmitter and the adjacent transmitter is calculated based on the position of each transmitter registered in the transmitter position information. A calculated distance and a transmitter number of the adjacent transmitter are stored by further relating these pieces of information to the transmitter number and the position.

Based on the above arrangement, when the receiver 11 first receives a certain transmitter number, the receiver 11 stores this time, and when the receiver 11 receives a different transmitter number (a transmitter number of the adjacent transmitter), the receiver 11 calculates a difference between this time and the recorded time. The receiver 11 can estimate a running speed of the cart terminal device 10, that is, the shopping cart, based on the calculated time and the distance between the transmitters.

Using this running speed, when the running speed of the shopping cart exceeds a predetermined reference speed, the output of information concerning the goods to the display device 12 is stopped, thereby making it possible to prevent a rapid changeover of information on the screen. As a result, more flexible control can be performed regarding the output of information.

Further, while the cart terminal device is explained in the present embodiment, a setting-information creating program having a similar function can be obtained, by achieving the function of each processor held by the cart terminal device, by software. A computer that executes the setting-information creating program is explained next.

FIG. 12 is a functional block diagram of a configuration of the computer that executes the setting-information creating program according to the present embodiment. As shown in FIG. 12, a computer 100 includes a random access memory (RAM) 110, a central processing unit (CPU) 120, a hard disk drive (HDD) 130, a wireless LAN interface 140, an input/output interface 150, a receiver interface 160, and an information reader interface 170.

The RAM 110 stores a program and an intermediate result of the execution of the program. The CPU 120 reads the program from the RAM 110, and executes this program.

The HDD 130 stores a program and data. The wireless LAN interface 140 connects the computer 100 to other computer via the wireless LAN.

The input/output interface 150 connects a display device working as an input/output device such as a touch panel. The receiver interface 160 connects a receiver such as an infrared receiver and an IC tag reader. The information reader interface 170 connects an information reader such as a barcode reader.

A setting-information creating program 111 executed by the computer 100 is installed beforehand at the shipment time, or is stored in the database of other computer system connected via the wireless LAN interface. The setting-information creating program is read from the database, and is installed in the computer 100.

The installed setting-information creating program 111 is stored in the HDD 130, and is read out to the RAM 110. The CPU 120 executes the program as a setting-information creating process 121.

While the application of the present invention to the goods-information output system that outputs goods information in the shop such as a supermarket and a convenience store is explained in the present embodiment, the application field of the present invention is not limited to this. For example, the present invention can be similarly applied to an exhibition hall or a museum where visitors carry information terminals and the information terminals provide information about the display.

Among the respective process described in the present embodiment, all or a part of the process explained as being performed automatically can be performed manually, or all or a part of the process explained as being performed manually can be performed automatically in a known method.

In addition, the process procedures, control procedures, specific names, and information including various kinds of data and parameters shown in the present specification or the drawings can be optionally changed unless otherwise specified.

The respective constituent elements of the devices shown in the drawings are functionally conceptual, and physically the same configuration is not always necessary. That is, the specific mode of dispersion and integration of the devices is not limited to the shown ones, and all or a part thereof can be functionally or physically dispersed or integrated in an optional unit, according to various kinds of load and the status of use.

According to the present invention, setting information to be used to control the output of information can be registered and changed easily.

According to the present invention, work required to create the setting information can be decreased, by simultaneously creating the transmitter-position setting information and the output-information setting information. As a result, the setting information to be used to control the output of information can be registered and changed more easily.

According to the present invention, the setting information to be used to control the output of information can be registered and changed more easily, by achieving the user interface to create the setting information using a display device and icons.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A setting-information creating apparatus that creates setting information to be set to an information terminal device that outputs information relevant to goods within a site based on transmitter information transmitted from a transmitter installed at each point within the site, the setting-information creating apparatus comprising:
   a goods-layout-setting storage unit that stores therein goods-layout setting information indicating a correspondence between region information specifying a region within the site and goods information specifying goods laid out in the region;
   an output-information-setting storage unit that therein stores output-information setting information indicating a correspondence between the transmitter information and the goods information;
   a setting-information creating unit that obtains a first goods information corresponding to an optional position within the site assigned by a user, based on the goods-layout-setting information, obtains a second goods information corresponding to an optional transmitter assigned by the user, based on the output-information setting information, and creates transmitter-position setting information representing a predetermined correspondence between the position information for identifying the position assigned by the user and the transmitter information for identifying the transmitter assigned by the user, when the obtained first and second goods information coincide with each other; and
   a goods-layout-information output unit that outputs goods-layout information indicating a correspondence between the region within the site and the goods information identifying the goods laid out in the region, to a display device, wherein
   when the position and the transmitter are assigned by the user based on the goods-layout information output from the goods-layout-information output unit, the setting-information creating unit obtains a third goods information corresponding to the position assigned by the user and a fourth goods information corresponding to the transmitter assigned by the user, and creates transmitter-position setting information indicating a correspondence between the position information identifying the position and the transmitter information identifying the transmitter, when the third and fourth goods information coincide with each other.

2. The setting-information creating apparatus according to claim 1, wherein when the second goods information corresponding to the transmitter assigned by the user is not included in the output-information setting information, the setting-information creating unit obtains the first goods information corresponding to the position assigned by the user based on the goods-layout setting information, and further stores in the output-information-setting storage unit the output-information setting information indicating a correspondence between the first goods information and the transmitter information for identifying the transmitter assigned by the user.

3. A setting-information creating method for creating setting information to be set to an information terminal device that outputs information relevant to goods within a site based on transmitter information transmitted from a transmitter installed at each point within the site, the setting-information creating method comprising:
   storing goods-layout setting information indicating a correspondence between region information specifying a region within the site and goods information specifying goods laid out in the region;
   storing output-information setting information indicating a correspondence between the transmitter information and the goods information;
   obtaining a first goods information corresponding to an optional position within the site assigned by a user, based on the goods-layout-setting information;
   obtaining a second goods information corresponding to an optional transmitter assigned by the user, based on the output-information setting information;
   creating transmitter-position setting information representing a predetermined correspondence between the position information for identifying the position assigned by the user and the transmitter information for identifying the transmitter assigned by the user, when the obtained first and second goods information coincide with each other; and
   outputting goods-layout information indicating a correspondence between the region within the site and the goods information identifying the goods laid out in the region, to a display device, wherein
   when the position and the transmitter are assigned by the user based on the goods-layout information output to the display device, obtaining a third goods information corresponding to the position assigned by the user and a fourth goods information corresponding to the transmitter assigned by the user, and creating transmitter-position setting information indicating a correspondence between the position information identifying the position and the transmitter information identifying the transmitter, when the third and fourth goods information coincide with each other.

4. The setting-information creating method according to claim 3, wherein when the second goods information corresponding to the transmitter assigned by the user is not included in the output-information setting information, obtaining the first goods information corresponding to the position assigned by the user, based on the goods-layout setting information, and storing the output-information setting information indicating a correspondence between the first goods information and the transmitter information for identifying the transmitter assigned by the user.

5. A computer-readable recording medium that stores therein a computer program for creating setting information to be set to an information terminal device that outputs information relevant to goods within a site based on transmitter information transmitted from a transmitter installed at each point within the site, the computer program causing the computer to execute:
   storing goods-layout setting information indicating a correspondence between region information specifying a region within the site and goods information specifying goods laid out in the region;
   storing output-information setting information indicating a correspondence between the transmitter information and the goods information;
   obtaining a first goods information corresponding to an optional position within the site assigned by a user, based on the goods-layout-setting information;
   obtaining a second goods information corresponding to an optional transmitter assigned by the user, based on the output-information setting information;
   creating transmitter-position setting information representing a predetermined correspondence between the position information for identifying the position assigned by the user and the transmitter information for identifying the transmitter assigned by the user, when the obtained first and second goods information coincide with each other; and
   outputting goods-layout information indicating a correspondence between the region within the site and the goods information identifying the goods laid out in the region, to a display device, wherein
   when the position and the transmitter are assigned by the user based on the information output to the display device, obtaining a third goods information corresponding to the position assigned by the user and a fourth goods information corresponding to the transmitter assigned by the user, and creating transmitter-position setting information indicating a correspondence between the position information identifying the position and the transmitter information identifying the transmitter, when the third and fourth goods information coincide with each other.

6. The computer-readable recording medium according to claim 5, wherein when the second goods information corresponding to the transmitter assigned by the user is not included in the output-information setting information, obtaining the first goods information corresponding to the position assigned by the user, based on the goods-layout setting information, and storing the output-information setting information indicating a correspondence between the first goods information and the transmitter information for identifying the transmitter assigned by the user.

7. An information output system comprising an information terminal device that outputs information concerning goods within a site, based on transmitter information transmitted from a transmitter installed at each point within the site, and a server device that manages the information terminal device, wherein
   the server device comprising:
      a goods-layout-setting storage unit that stores therein goods-layout setting information indicating a correspondence between region information specifying a region within the site and goods information specifying goods laid out in the region;
      an output-information-setting storage unit that stores therein output-information setting information indicating a correspondence the transmitter information and the goods information;
      a setting-information creating unit that obtains a first goods information corresponding to an optional position within the site assigned by a user, based on the goods-layout-setting information, obtains a second goods information corresponding to an optional transmitter assigned by the user, based on the output-information setting information, and creates transmitter-position setting information representing a predetermined correspondence between the position information for identifying the position assigned by the user and the transmitter information for identifying the transmitter assigned by the user, when the obtained first and second goods information coincide with each other; and a setting-information transmitting unit that transmits the goods-layout setting information, the output-information setting information, and the transmitter-position setting information to the information terminal device, and the information terminal device comprising:

a setting-information receiving unit that receives the goods-layout setting information, the output-information setting information, and the transmitter-position setting information transmitted from the server device; and a goods-relevant-information output unit that outputs information concerning goods within the site, based on the goods-layout setting information, the output-information setting information, and the transmitter-position setting information received by the setting-information receiving unit, when the goods-relevant-information output unit receives the transmitter information transmitted from the transmitter.

* * * * *